United States Patent
Chattopadhyay et al.

(10) Patent No.: US 7,191,248 B2
(45) Date of Patent: Mar. 13, 2007

(54) COMMUNICATION STACK FOR NETWORK COMMUNICATION AND ROUTING

(75) Inventors: Somak Chattopadhyay, Redmond, WA (US); Trevor Gulick, Redmond, WA (US); Sivaprasad Padisetty, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 376 days.

(21) Appl. No.: 10/651,780

(22) Filed: Aug. 29, 2003

(65) Prior Publication Data

US 2005/0050203 A1    Mar. 3, 2005

(51) Int. Cl.
G06F 15/173   (2006.01)
G06F 15/16    (2006.01)
G06F 3/00     (2006.01)

(52) U.S. Cl. .................. 709/238; 710/11; 709/237

(58) Field of Classification Search ............. 709/217, 709/218, 227–230, 236–238, 249–250; 710/11
See application file for complete search history.

(56) References Cited

U.S. PATENT DOCUMENTS

| | | | |
|---|---|---|---|
| 5,764,915 A | | 6/1998 | Heimsoth et al. |
| 5,825,890 A | * | 10/1998 | Elgamal et al. ............. 713/151 |
| 5,920,703 A | | 7/1999 | Campbell et al. |
| 5,938,733 A | | 8/1999 | Heimsoth et al. |
| 6,003,088 A | | 12/1999 | Houston et al. |
| 6,141,686 A | * | 10/2000 | Jackowski et al. ........... 709/224 |
| 6,148,336 A | * | 11/2000 | Thomas et al. ............. 709/224 |
| 6,172,981 B1 | | 1/2001 | Cox et al. |
| 6,233,624 B1 | | 5/2001 | Hyder et al. |
| 6,631,416 B2 | * | 10/2003 | Bendinelli et al. ........... 709/227 |
| 6,804,624 B2 | * | 10/2004 | Silverman .................... 702/159 |
| 6,823,437 B2 | * | 11/2004 | Boyd et al. ................. 711/170 |
| 6,853,988 B1 | * | 2/2005 | Dickinson et al. ............ 705/75 |
| 6,912,522 B2 | * | 6/2005 | Edgar ............................ 707/2 |
| 6,934,249 B1 | * | 8/2005 | Bertin et al. ................. 370/218 |

* cited by examiner

*Primary Examiner*—Saleh Najjar
*Assistant Examiner*—V. Korobov
(74) *Attorney, Agent, or Firm*—Christensen O'Connor Johnson Kindness PLLC

(57) ABSTRACT

A communication stack enables computers implementing it to send, receive, or route network communications. The communication stack includes a message layer, a communication layer, a security layer, and a transport protocol layer, with plug-in transport protocol modules and plug-in security protocol modules. Each of the origin computer, target computer, and routing computers involved in delivering a message implements the communication stack. An application on the origin computer calls the message layer of the computer to send messages to a target computer and identifies routing computers on the route for delivering the message to the target computer. The message layer calls the communication layer to establish a connection to the target computer. The communication layer uses the transport protocol layer to establish an initial connection with the target computer, and uses the security layer to negotiate security parameters and to handle secured communications between the origin and target computers.

28 Claims, 5 Drawing Sheets

COMMUNICATION STACK FOR NETWORK COMMUNICATION AND ROUTING

TECHNICAL FIELD

This invention relates generally to computer networks, and more particularly to a communication infrastructure that can be implemented in computers for sending, routing, or receiving network communications.

BACKGROUND OF THE INVENTION

In some networking scenarios, there are needs for computers located in different domains or disparate networks and having different platforms and networking capabilities to talk to one another. For instance, the testing of computer networking and application interactions often involve getting one computer with certain testing configuration to interact with another computer with a similar or different testing configuration. For instance, in a test of distributed client-server interactions, one computer that supports only Internet Protocol Version 4 may try to communicate with another computer that supports only Internet Protocol Version 6 over a complicated network topology that might include firewalls, multiple domains, etc. One major issue for such communications is that the two computers may not even be able to form a connection with each other through regular network links. In other words, the two machines may not have direct network connectivity. For instance, the computers may be located on two different networks that have not established trust and thus does not allow messages to be routable across the networks. Also, the two computers may support different transport protocols and thus cannot directly send or receive messages from each other.

Moreover, even if the two machines can form an initial connection, there are other issues that have to be addressed before they can effectively communicate with each other. For instance, if secured communication is required, two machines on disparate networks have to be able to negotiate a security protocol to be used through a third machine that has connectivity to both without trusting the third machine. Also, in some cases one or both computers involved in the network communications may be down or otherwise unable to send or receive messages, and the reliability of the delivery of communication messages will be a concern. For instance, if the two computers communicate to each other as part of a testing operation, and one testing step of one computer is to install an operating system and reboot after the installation, it may not receive messages from the other computer during that period.

SUMMARY OF THE INVENTION

In view of the foregoing, the present invention provides a communication stack infrastructure that enables computers implementing it to send, receive, or route network communications. The communication stack includes a message layer, a communication layer, a security layer, and a transport protocol layer. The transport layer includes pluggable transport protocol modules that can be selected for sending messages. Similarly, the security layer has pluggable security protocol modules that can be selected for handling security operations. The pluggable framework imparts flexibility and extensibility to the communication stack. A computer implementing the communication stack can work with other computers implementing the same communication stack to function as a sender, receiver, or router of communication messages. To send messages to a target computer, an application on an "origin" computer (i.e., a computer that initiates a communication connection to the target computer) calls the message layer of the communication stack on the origin computer and provides information identifying the target computer and the route through which the message is to be send. The message layer then calls the communication layer to establish the connection for delivering the message through the routing computers between the sending and target computers. The communication layer calls the transport protocol layer to establish an initial connection with the communication layer with the target computer. After the initial connection is established, the communication layer of the origin computer calls the security layer to negotiate security parameters for subsequent communications. The communication layer then uses the security layer to transmit the payload of the message and to handle subsequent communications.

DETAILED DESCRIPTION OF THE INVENTION

Figure 1:
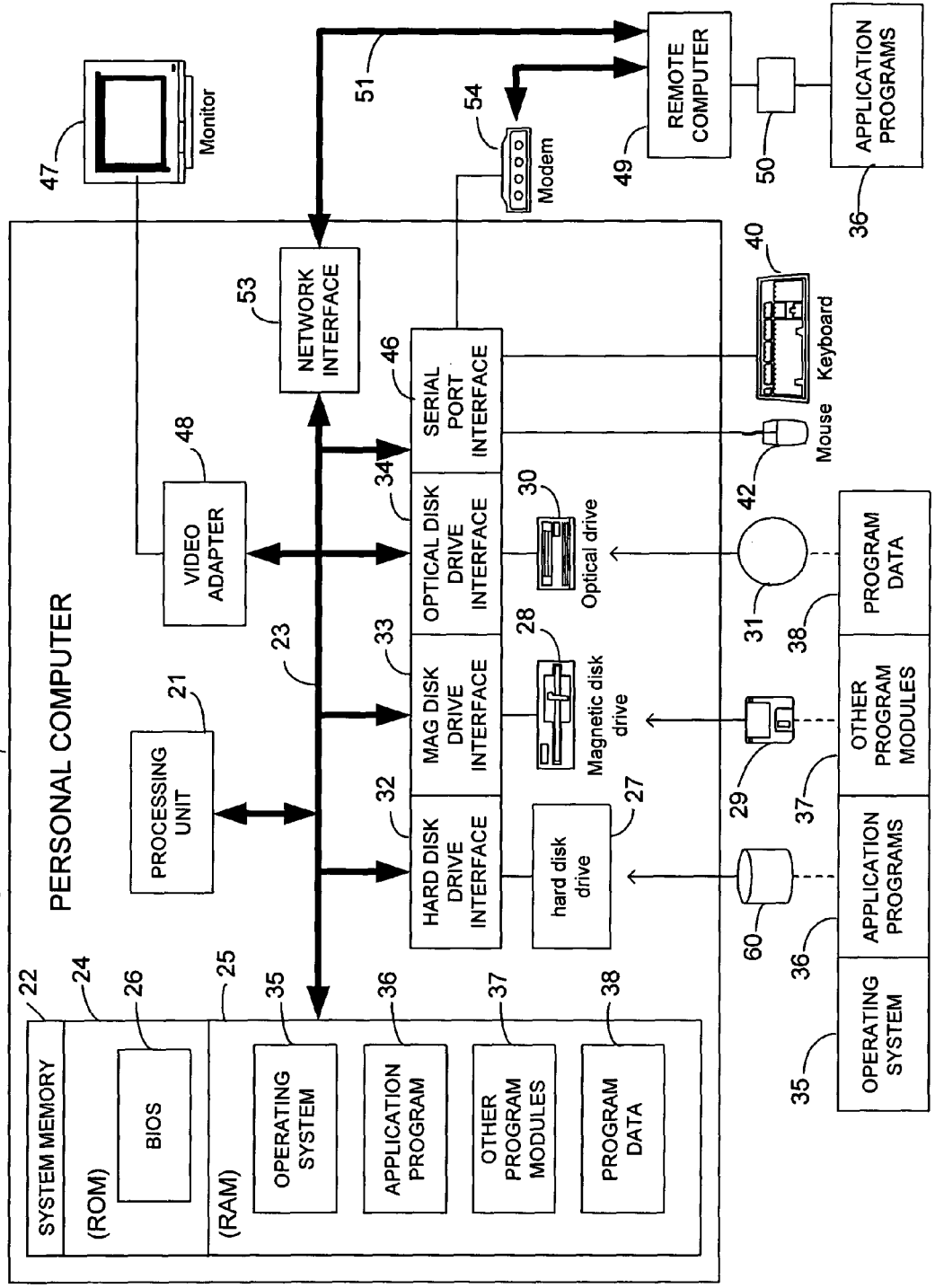
FIG. 1 is a block diagram generally illustrating an exemplary computer system on which an embodiment of the communication stack for network communications in accordance with the invention may be implemented.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may be practiced in distributed computing environments where tasks are performed by remote processing devices that are linked through a communications network. In a distributed computing environment, program modules may be located in both local and remote memory storage devices.

The following description begins with a description of a general-purpose computing device that may implement a communication stack for use by applications on different computers to communicate with each other. The communication stack of the invention and its operation in sending, receiving and routing communication messages will be described in greater detail with reference to FIG. 2–5. Turning now to FIG. 1, a general purpose computing device is shown in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, storage area networks, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB) or a network interface card. A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Figure 2:
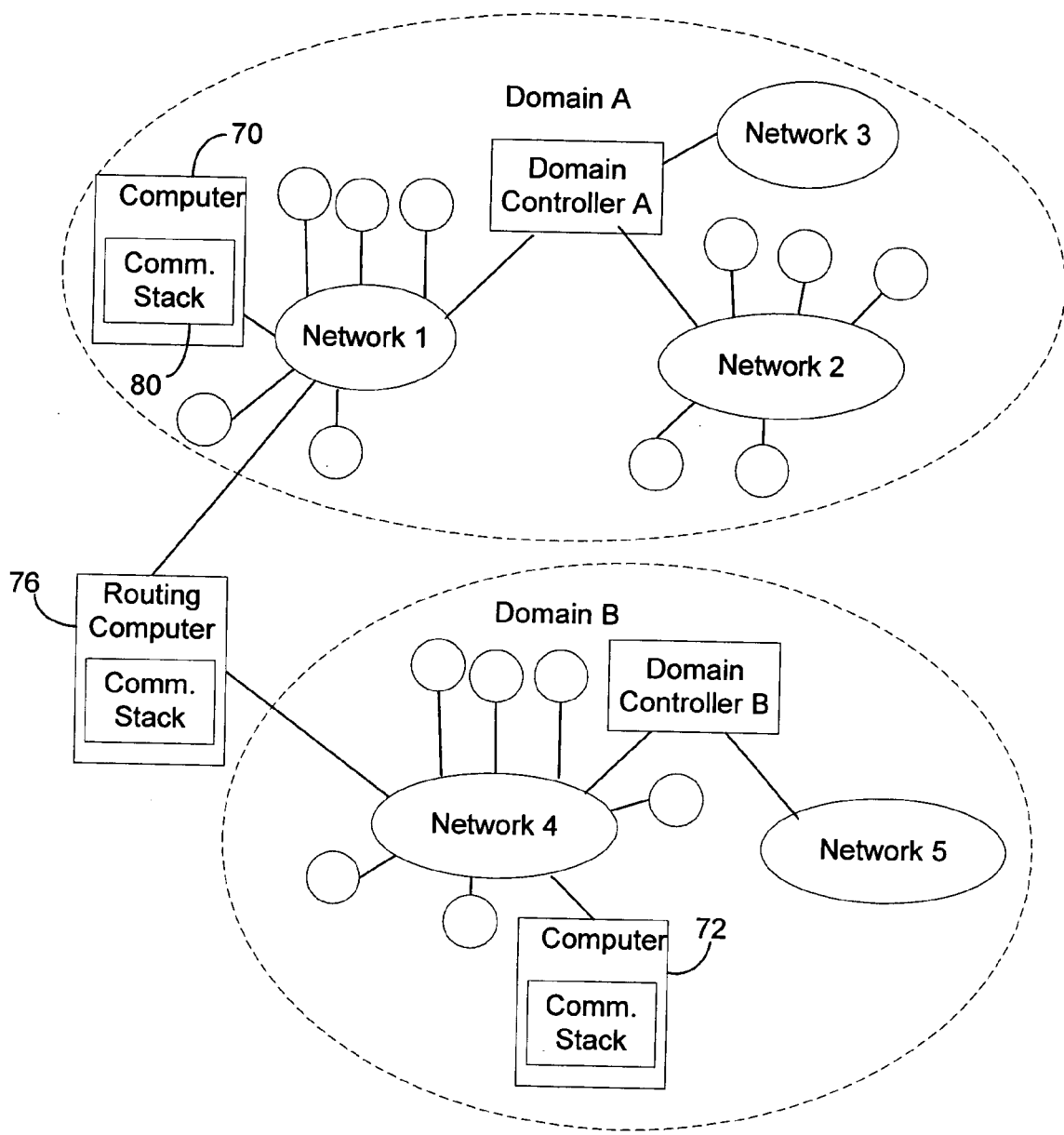
FIG. 2 is a schematic diagram showing a plurality of computers located in different networks that may use the communication stack of the invention to send, route, or receive messages.

Referring now to FIG. 2, the present invention is directed to a new communication stack framework that can be used to handle the delivery of network communication messages between computers that may not have direct network connectivity over a conventional network infrastructure. For illustration purposes, FIG. 2 shows two network domains each having multiple computers. A computer 70 on one network in domain A may need to communicate with a computer 72 on another network in domain B. Due to network connectivity issues, however, the computer 70 in domain A may not be able to form a connection with the computer 72 over the network structure using standard network communication means provided by their operating systems. Also, the different configurations of the two computers may also make them unable to talk to each other directly. For instance, the computer 70 may support only TCP as its network transport, while the other computer 72 may only support UDP. Thus, the computer 70 and the computer 72 may be unable to communicate to each other through conventional network links.

In accordance with the present invention, a communication stack 80 is provided to a computer 70 to enable it to send a message to a target computer implementing the same communication stack, and the message may be forwarded through a route with routing computers, such as the computer 76, that also implement the communication stack. As will be described in greater detail below, among the computers implementing the communication stack of the invention, each computer may function as a sender, a receiver, or a router between the sender and the receiver. This enables the computer 70 to send communication data through the computer 76 to the target computer 72 to establish a connection, negotiate security parameters, and then send subsequent transmissions via a secured connection, as will be described in greater detail below.

Figure 3:
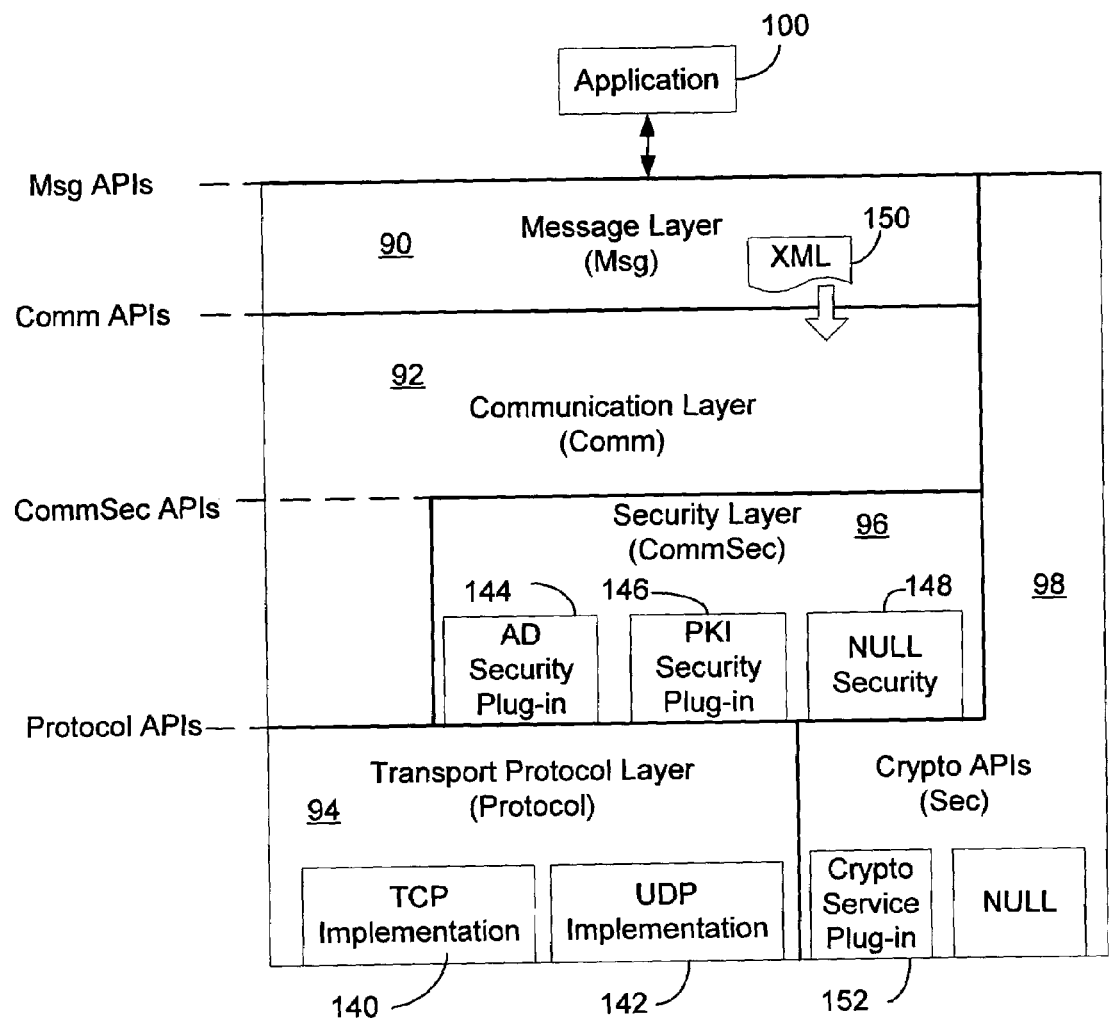
FIG. 3 is a schematic diagram showing the architecture of an embodiment of the communication stack of the invention.

FIG. 3 shows an embodiment of the communication stack 80 in accordance with the invention. As shown in FIG. 3, the communication stack 80 includes a message layer 90, a communication layer 92, a transport protocol layer 94, a security layer 96, and a cryptography layer 98. Generally, the message layer 90 functions as an interface between an application 100 and the communication layer 92 below it. By interacting with the message layer 90, he application 100 can send messages to another application on a target computer, without having to worry about the details of carrying out the message delivery operation. The message layer obtains from the application the contents of the message to be sent as well as route configuration information regarding the delivery route for the message. In one implementation, the configuration information includes data identifying the target machine (or machines) for the message and its port number (corresponding to the application on the target machine that is to receive the message), the route to each target machine, and the security configuration for use in communicating with the target machine. The routing information identifies the routing computer for each hop in the route, and the transport protocol used by each routing computer in the route ending at the target machine. The security configuration for communicating each target machine indicates in alternative the authentication mechanism to be used, such as Active Directory Authentication or PKI infrastructure. The security configuration also indicates if the message has to be delivered encrypted or signed.

In accordance with an aspect of the invention, the message layer 90 also stores the message in case the target machine is not available to establish the connection or receive the message. For instance, in one scenario, the communications between the machines may be performed for the purpose of carrying out a testing operation that involves the interaction among the machines. A target machine may be required to install an operating system as part of the testing sequence. During the installation and the subsequent reboot operation, the target machine will not be able to receive the message from the sending machine. If the message cannot be delivered, the message layer will store it in a message buffer or queue, and try to deliver it at a later time.

Figure 4:
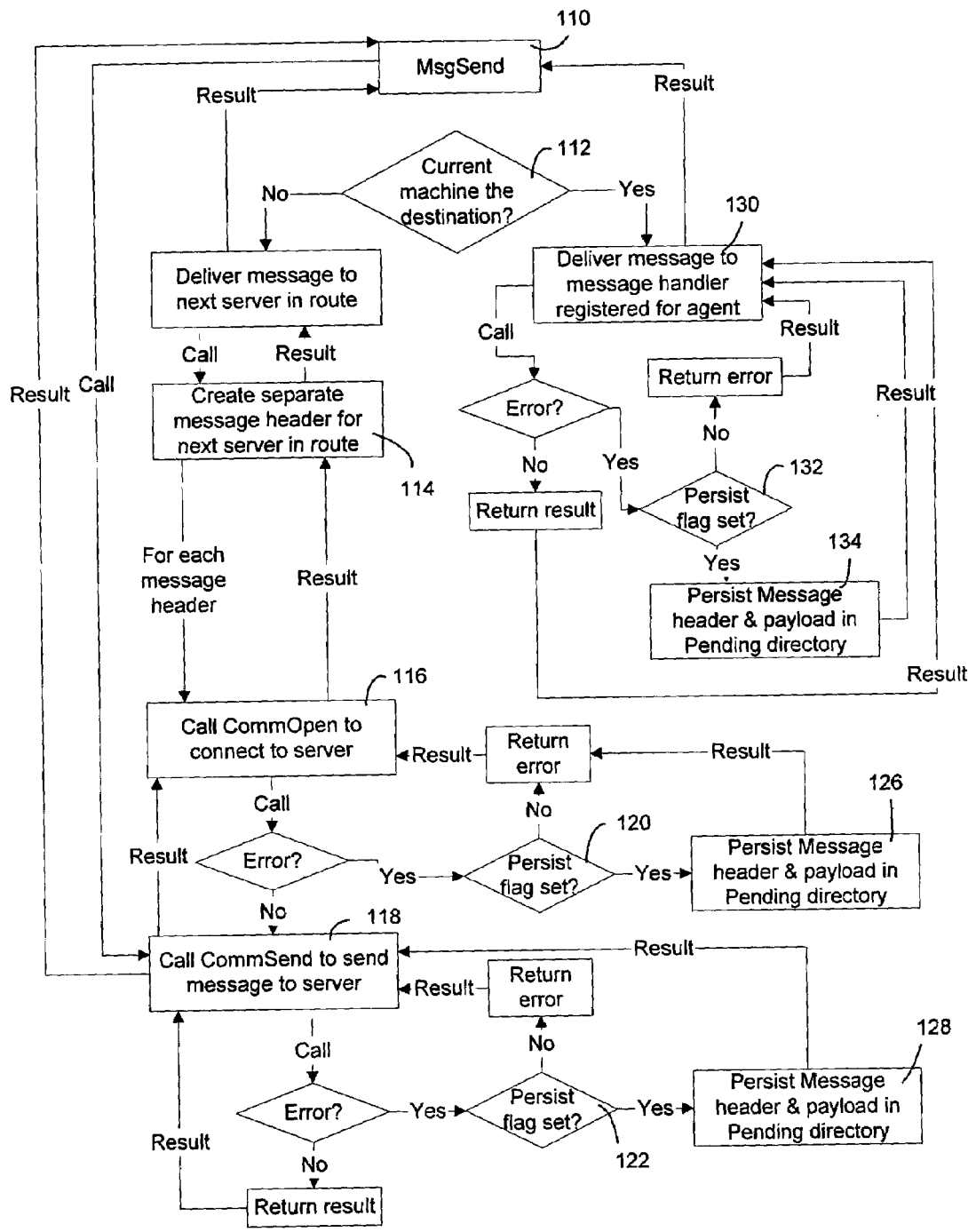
FIG. 4 is a flowchart showing the operation of a message layer in the communication stack.

FIG. 4 shows the operation of the message layer in one embodiment of the invention. When the message layer is called through a MsgSend API function (step 110) to deliver a message, the message layer determines from the message header whether the current machine is the final destination of the message (step 112). In an alternative embodiment, this decision is made by the communication layer. If the current machine is not the final destination, the message is delivered to the next server in the route. To that end, a modified message header is created for the next server in the route (step 114). The CommOpen API function is then called to use the communication layer to connect to the next server in the route (step 116). The CommSend API function is then called to send the message to the next server (step 118). If the call to either the CommOpen function or the CommSend function returns an error, the message layer checks whether the persistent flag for the message is set (step 120 or 122). If so, the message header and payload are persistently stored in a message queue (step 126 of 128), and the open and send steps will be repeated later to try to forward the message to the next server.

If, on the other hand, it is determined that the current machine is the final destination of the message (step 112), the message layer delivers the message to a message handler function registered with the message layer by the target application to receive messages with a given TargetType attribute (step 130). If an error occurs in this step, the message header is checked to see whether the persistent flag is set (step 132). If so, the message header and the payload are persistently stored in the message queue (step 134).

Returning to FIG. 3, in accordance with another aspect of the invention, the transport protocol layer and the security layer preferably use plug-in protocol modules to provide the transport and security functionality. For instance, as shown in FIG. 3, the transport layer 94 may have plug-in protocol modules 140 and 142 for TCP and UDP, respectively, and the security layer 96 may have plug-in security protocol modules 144, 146, 148 for security operations according to the Active Directory security process, the public key (PKI), or NULL, respectively. The NULL security is a dummy security module for machines that does not support security or encryption. By providing a framework that enables the use of plug-in modules, the communication stack on each computer can be easily adapted to use different transport or security protocols that are in use today or will be developed in the future.

In a preferred embodiment, the message layer 90 puts the message payload and the delivery information in an XML document 150 and passes to the communication layer 92. The communication layer 92 parses the XML input it receives from the message layer and tries to open the connection to the target machine using the correct transport protocol layer implementation. To that end, the communication layer creates a message header with the route configuration information specified therein. The routing information in this message header is used by the communication stack to establish a connection all the way to the target machine through the intermediate routers, if any, as specified in the delivery configuration information. This connection is then handed over to the security layer 96.

The security layer of the sending machine then negotiates with the security layer of the target machine regarding which security/authentication protocol will be used for security handshake, and then performs the handshake. In one preferred embodiment, at the end of the security handshake, both the target machine and the sending machine will have a symmetric shared key that they will use in the following communication for encryption. Now the message layer 90 and the communication layer 92 are ready to send or receive messages as encrypted or signed buffers. All the subsequent communication happens through the security layer, which encrypts or signs on the sending side as instructed, and decrypts or verifies the signature of the received message on the receiving side. This connection between the origin computer and the target computer can be used to send and receive unspecified amount of data in a secured way.

The cryptographic module 98 is provided to abstract the cryptographic implementation for the communication stack. This module is mainly a helper module. In one implementation, the cryptographic functions are provided by cryptography provider dynamic link library (DLL) and exposes a plurality of API functions than can be called by the application 100, the message layer 90, the communication layer 92, or the security layer 96. The cryptographic module 98 is made separate from the other layers so that the communication stack can operate without cryptographic operations on machines that do not support cryptography, such as machines running on a simplified operating system. In a preferred embodiment, the cryptography module has plug-in modules 152 for using different cryptographic service providers.

Figure 5:
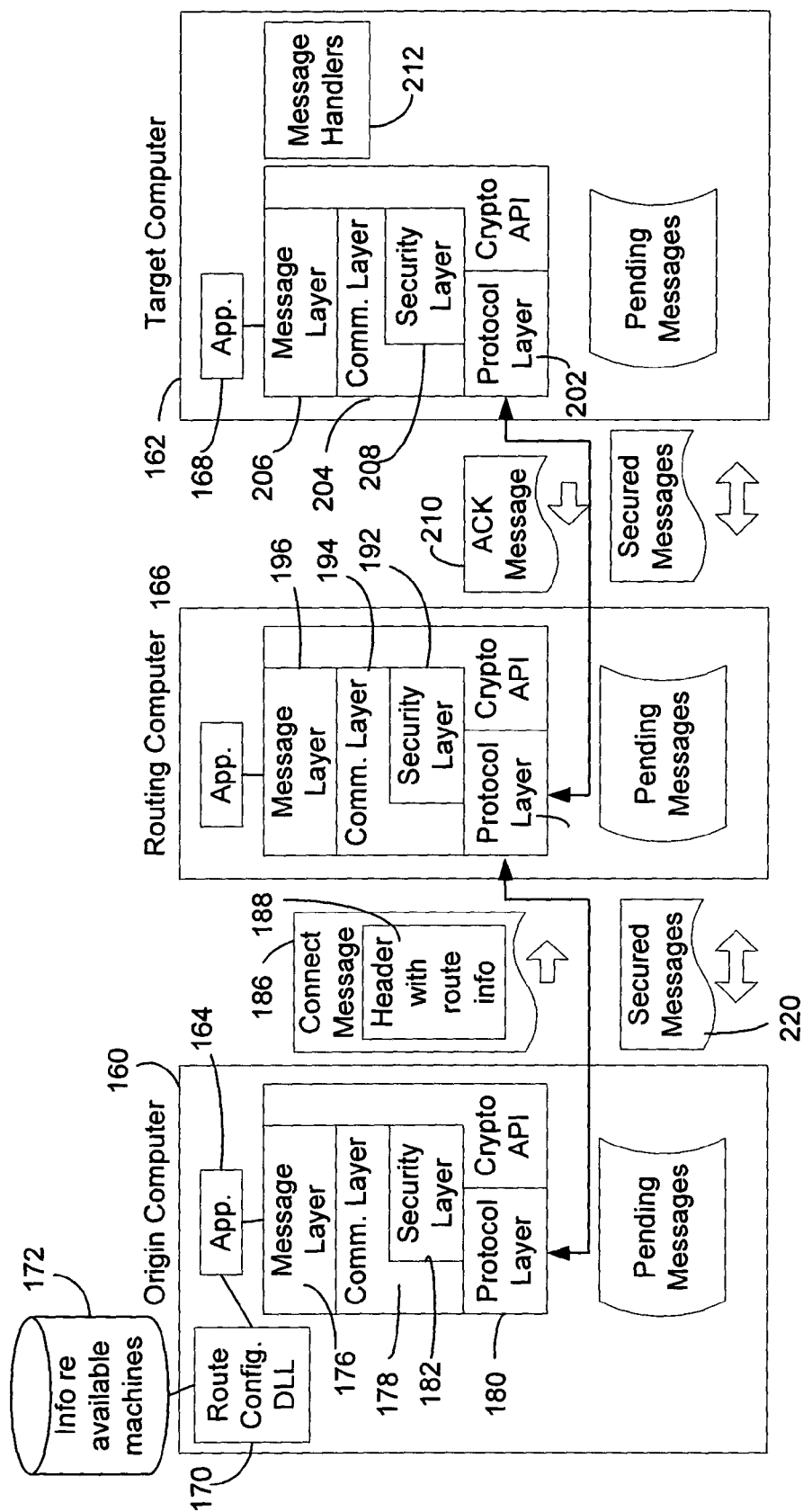
FIG. 5 is a schematic diagram showing two computers that communicate through one or more routing computers, with each computer implementing the communication stack of FIG. 3.

To illustrate the process of utilizing the communication stack to establish connections and routing messages, FIG. 5 shows two computers 160, 162 that communicate through an intermediate routing computer 166. It will be appreciated, however, that whether a router is used will depend on the locations of the sending and receiving computers, and more than one routing computer may be used for routing messages between the two computers.

In the example of FIG. 5, the computer 160 is referred to as the "origin computer" because it is the one that initiates a connection to the computer 162, which is referred to as the "target computer." When the application 164 on the origin computer 160 wants to start sending messages to another application 168 on the target computer 162, it calls a helper DLL function 170 to identify a route for delivering messages to the target computer. The helper DLL consults a database 172 that contains information of all available machines that implement the communication stack and thus can be used for routing. The machine information includes their locations and network connectivity, such as the transport protocols supported by each of them, etc. The database may be on the local machine of the origin computer, or alternatively may be accessible over a network connection. The helper DLL 170 selects machines to form a route that leads to the target machine 162. As mentioned above, the route may include no routing machines (i.e., directly from the origin computer to the target computer), or multiple routing machines. After the route is selected, the helper DLL 172 returns data identifying the route to the application 164. In one embodiment, the route data includes data identifying each machine in the route and the transport protocol it supports. In other words, the route data specifies the transport protocol in each stop of the route all the way up to the target computer.

The application 164 then passes the message to be delivered and the route data to the message layer 176. The message layer then calls the communication layer 178 and gives it the route configuration data to first form a connection with the target computer 162. As mentioned above, in a preferred embodiment, the message layer 176 and the communication layer 178 pass data in the form of XML documents. After the communication layer 178 receives the XML document containing the routing configuration for message delivery, it parses the XML lines and generates a connection message 186 to be sent to the target computer 162 for establishing a connection. The header 188 of the connection message 186 includes data identifying all the hops from the origin computer to the target computer. The communication layer 178 then calls the transport layer 180 to send the connection message 186. The transport protocol layer than uses the plug-in module for the selected transport protocol to send the connection message to the first hop on the route, which in the example of FIG. 5 is the routing computer 166.

As shown in FIG. 5, the routing computer 166 implements the same communication stack of FIG. 3 as the sender and target machines do. By implementing the same communication stack, the computers can communication in a peer-to-peer fashion, with each of the machines capable of functioning as a sender, a router, or a receiver of messages. When the routing computer 166 receives the connection message sent by the origin computer, its transport layer 192 passes the message to its communication layer 194, which in turn passes the message to the message layer 196. The message layer 196 checks the header of the message and sees that the routing computer is not the final destination of the message. In response, it modifies the header to indicate that the message will go to the next computer in the route. The communication layer 194 then calls the transport layer 192 to make a connection to the next hop to send the message, and the transport layer forwards the message to the next computer as indicated in the message header. The routing computer then keeps forwarding message buffers received from either side to the other side. In an alternative embodiment, the communication layer 194, rather than the message layer 196, checks whether the message is for the current machine and, if not, modifies the message header and opens the connection to the next hop on the route. As a result, the message layer 196 is not involved in the routing operation.

In the example of FIG. 5, the target computer 162 is the next hop from the routing computer. When its communication layer 204 receives the connection message, it recognizes that the target computer is the final destination of the message. In response, it returns an acknowledgment message 210 to the origin computer 160 to establish the connection. Also, a message handler 212 for the target application 168 is registered with the message layer 206 for receiving subsequent messages from the origin computer. The acknowledgment message 210 is sent to the next hop in the route, which is the routing computer 166. The routing computer forwards the acknowledgment message to the origin computer 160. When the communication layer 178 of the origin computer 160 receives the response message from the target computer, it calls the security layer 182 to negotiate with the security layer 208 of the target computer 162 regarding the security protocols to be used in subsequent communications between the two machines. As the result of the security negotiation, the two security layers 182 and 208 decide on a symmetric shared secret key that can be used for encrypting/decrypting and authenticating data transmitted between the two. After the security layers 182 and 208 have successfully negotiated the security parameters, the subsequent communications between the two machines will go through the security layers, which performs the required security operations. The communication layer 178 calls the security layer 182 to deliver the message payload it received from the message layer 176 (which in turn received message from the application 164). The security layer 178 encrypts the message using the negotiated key and/or signs the message with the key, and calls the transport layer 180 to send the message 220 through the established route. When the transport layer 202 of the target computer 162 receives the message, it sends the message to the security layer 208, which decrypts the message and/or verifies the signature, and then passes the decrypted/authenticated message to the communication layer 204. The communication layer then passes the message to the message layer 206, which delivers the message to the message handler function registered for the application 168 that is the intended recipient of the message.

In accordance with an aspect of the invention, different transport protocols may be used along the route to deliver the message from the origin computer and the target computer. By way of example, in the message delivery illustrated in FIG. 5, the origin computer 160 may support only TCP, while the target computer 162 may support only UDP. The two computers can still communicate with each other, however, if the routing computer 166 supports both TCP and UDP. When the routing computer 166 receives a message from the origin computer 160 via TCP, it converts it to a UCP message and forwards the message to the target computer 162 via UDP. In the reverse direction, the routing computer converts messages from the target computer 162 via UDP to TCP messages and sends them to the origin computer 160 via TCP.

Returning to FIG. 3, in a preferred embodiment, the application invokes the communication stack by calling appropriate application programming interface (API) functions, and the layers in the communication stack interact with each other also via API functions. Also, data are passed between the application and the layers of the communication stack as XML documents. The schema for data passing and the API functions provided in one implementation will be described in detail below. It will be appreciated that the concept and embodiments of the invention are not restricted to any particular applications and can be used to enable any two or more machines to communicate in a secured fashion.

MessageHeader schema: The schema is defined for the XML documents passed across the layers of the communication stack.

1. MessageHeader: (required) (1)
   a. These elements and attributes define message handling and delivery characteristics.
   b. Message: (required) (1)
      i. These attributes specify how to handle delivering a message.
      ii. ID: (required) (generated)
         1. The ID is a generated GUID that is unique to each message.
      iii. Target: (required)
         1. The Target identifies the message handler on the server to deliver the message to (see MsgRegisterHandler).
      iv. Class: (optional)
         1. The Class is an attribute that the client and/or server can define and use for what purposes they require.
      v. UserID: (optional)
         1. The UserID is defined by the client. If this ID is specified in a message that is persisted, then any existing message with the same ID will be overwritten.
      vi. RetryInterval: (optional)
         1. If a message is persisted, then the RetryInterval specifies how often to retry sending the persisted message.
      vii. Timeout: (required)
         1. The Timeout specifies how long to wait for a message to be delivered and a reply received before the request times out and an error occurs.
   c. Reply: (optional) (1)
      i. These attributes are the same as the Message attributes, and they specify how to handle delivering a reply message. The Reply can be used by a client to specify where a message handler should send a reply message. The Reply in the reply message would contain the Message from the original message.
   d. CommHeader: (required) (1)
      See below.

CommHeader schema:
1. CommHeader: (required) (1)
   a. These elements and attributes define connection specific characteristics. Eventually multiple connections and/or connections using one or more intermediate connections may be implemented.
   b. Connection: (required) (1+)
      i. CommProtocol: (required) (1)
         1. See below.
      ii. CommSecurity: (optional) (1)
         1. See below.
      iii. Connection: (optional) (0+)
         1. This is a subconnection that specifies that the parent connection is an intermediate connection. Connection(s) or subconnection(s) that have no subconnections themselves represent the final target connection(s).
   c. ReplyRoute: (optional) (1)
      i. The ReplyRoute can be used to define a route that the message handler should use to send a reply.

CommProtocol schema:
1. CommProtocol: (required) (1)
   a. These attributes define the required protocol-specific characteristics.
   b. DLL: (required) (1)
      i. The protocol implementation DLL.
   c. <others>: (?)
      i. Additional attributes defined by the specific protocol.

CommSecurity schema:
1. CommSecurity: (required) (1)
   a. These attributes define the required protocol-specific characteristics.
   b. DLL: (required)
      i. The protocol implementation DLL.
   c. Flags: (required)
      i. Security flags (COMMSECURITY_FLAGS_*).
   d. <others>: (?)

The following are examples of XML contents based on the schema above.

Direct connection (SERVER):

```
<?xml version="1.0"?>
<MessageHeader>
    <Message ID="(generated)" Target="EA" Class="TaskUpdate"
UserID="EA<N>TaskUpdateID" RetryInterval="15" Timeout="60"/>
    <Reply ID="(original message ID)" Target=" EA.Error"
    Class="TaskUpdateError"
UserID="EA<N>TaskUpdateID" RetryInterval="15" Timeout="60"/>
    <CommHeader>
        <Connection>
            <CommProtocol DLL="CommTCPIP"
            ServerName="SERVER" Port="12345"
IPVersion="4"/>
            <CommSecurity DLL="CommSecurityPKI" Flags="3"
            PublicKey
="XKY0R321DSFE53"/>
        </Connection>
    </CommHeader>
</MessageHeader>
```

Multiple connection (SERVER1 and SERVER2):

```
<?xml version="1.0"?>
<MessageHeader>
    <Message ID="(generated)" Target="EA" Class="TaskUpdate"
UserID="EA<N>TaskUpdateID" RetryInterval="15" Timeout="60"/>
    <Reply ID="(original message ID)" Target="EA.Error"
    Class="TaskUpdateError"
UserID="EA<N>TaskUpdateID" RetryInterval="15" Timeout="60"/>
    <CommHeader>
        <Connection>
```

-continued

```
        <CommProtocol DLL="CommTCPIP"
        ServerName="SERVER1" Port="12345"
IPVersion="4"/>
        <CommSecurity DLL="CommSecurityPKI" Flags="3"
        PublicKey =
"XKY0R321DSFE53 SERVER1"/>
      </Connection>
      <Connection>
        <CommProtocol DLL="CommTCPIP"
        ServerName="SERVER2" Port="12345"
IPVersion="4"/>
        <CommSecurity DLL="CommSecurityPKI"
        Flags="3" PublicKey
="XKY0R321DSFE53 SERVER2"/>
      </Connection>
[s3]</CommHeader>
</MessageHeader>
```

Intermediate connection (SERVER2 via SERVER1):

```
<?xml version="1.0"?>
<MessageHeader>
    <Message ID="(generated)" Target="EA" Class="TaskUpdate"
UserID="EA<N>TaskUpdateID" RetryInterval="15" Timeout="60"/>
    <Reply ID="(original message ID)" Target="EA.Error"
    Class="TaskUpdateError"
UserID="EA<N>TaskUpdateID" RetryInterval="15" Timeout="60"/>
    <CommHeader>
      <Connection>
        <CommProtocol DLL="CommTCPIP"
        ServerName="SERVER1" Port="12345"
IPVersion="4"/>
        <Connection>
          <CommProtocol DLL="CommTCPIP"
          ServerName="SERVER2" Port="12345"
IPVersion="4"/>
          <CommSecurity DLL="CommSecurityPKI" Flags="3"
          PublicKey
="XKY0R321DSFE53"/>
        </Connection>
      </Connection>
    </CommHeader>
</MessageHeader>
```

The Msg APIs are described below. These are the APIs that the applications will implement or call to interact with the message layer and utilize the communication stack.

MSGHANDLER: This is Function Type definition for message handlers. This function type is implemented by the application layer and registered with the message layer. When a message arrived with a matching target type, this function is called by the message layer to deliver the message to the application layer.

```
typedef HRESULT (*MSGHANDLER)(
        IN LPCWSTR cwszHeader,
        IN DWORD dwPayloadType,
        IN DWORD dwPayloadSize,
        IN LPBYTE pbPayload,
        IN MSGCONTEXT* pMsgContext,
        OUT LPDWORD pdwReplyType,
        OUT LPDWORD pdwReplySize,
        OUT LPBYTE* ppbReply
        );
    Parameters
        cwszHeader
            Header in MessageHeader XML format.
        dwPayloadType
```

The payload type can be one of the following:

```
        COMM_MSG_TYPE_BINARY
            The payload type is binary data (byte)
        COMM_MSG_TYPE_XML
            The payload type is XML (WCHAR)
    dwPayloadSize
        The payload size (bytes).
    pbPayload
        The payload.
    pMessageContext
        The message context.
    pdwReplyType
```

The reply type can be one of the following:

```
        COMM_MSG_TYPE_BINARY
            The reply type is binary data (byte)
        COMM_MSG_TYPE_XML
            The reply type is XML (WCHAR)
    pdwReplySize
        The reply size (bytes).
    ppbReply
        The reply.
```

STREAMINGFUNCTION: This is the function type definition for a streaming function. The application layer implements the function and supplies it to the message layer as a way of exchanging an unlimited amount of data between machines. This streaming function is used in MsgClientStreamingSendAndReceive( ) function described below.

```
typedef HRESULT (*MSGSTREAMINGFUNCTION)(
        IN MSGCONTEXT* pMsgContext,
        IN DWORD dwInitDataSize,
        IN LPBYTE pbInitData,
        IN DWORD dwInDataSize,
        IN LPBYTE pbInData,
        IN DWORD dwOutBufferSize,
        OUT LPDWORD pdwOutDataSize,
        OUT LPBYTE* ppbOutData
        );
    Parameters
        pMsgContext
            The message context.
        dwInitDataSize
            The size of the initialization data.
        pbInitData
            The initialization data.
        dwInDataSize
            The size of the input data (bytes).
        pbInData
            The input data.
        dwOutBufferSize
            The size of the output buffer (bytes).
        pdwOutputDataSize
            The size of the output data.
        ppbOutputData
            The output data.
```

MsgRegisterHandler: This function registers the callback function used by a message target to receive messages.

```
HRESULT MsgRegisterHandler(
        IN DWORD dwFlags,
        IN LPCWSTR cwszTarget,
        IN MSGHANDLER MsgHandler,
```

-continued

```
        IN DWORD dwMaxNumThreads,
        IN DWORD dwTimeout,
        IN SECURITY_DESCRIPTOR* pSecurityDescriptor
        );
Parameters
    dwFlags
        Unused
    cwszTarget
```

The message target. The given message handler will be called for all messages delivered to the local machine and the given target. Currently four types of agents are defined:

```
        XML_MSG_TYPE_SPSRV
        XML_MSG_TYPE_EA
        XML_MSG_TYPE_DB
        XML_MSG_TYPE_FILE
MsgHandler
```

This callback function will be called for all messages targeted to the given target.
dwMaxNumThreads
The maximum number of threads allowed to call the function.
dwTimeout
The maximum time to wait to call the function.
pSecurityDescriptor
Security descriptor.
Remarks
Only one callback function can be registered for each message agent.
MsgUnregisterHandler: this function unregisters the callback function used by a message target to receive messages.

```
        HRESULT MsgUnregisterHandler(
            IN DWORD dwFlags,
            IN LPCWSTR cwszTarget,
            IN MSGHANDLER MsgHandler
            );
Parameters
    dwFlags
        Unused.
    cwszTarget
```

The message target that was previously registered.
MsgHandler
The function that was previously registered.
MsgSend: this function sends a message to a single target and supports optional store and forward functionality if the message send fails.

```
        HRESULT MsgSend(
            IN DWORD dwFlags,
            IN LPCWSTR cwszHeader,
            IN DWORD dwPayloadType,
            IN DWORD dwPayloadSize,
            IN LPBYTE pbPayload,
            OUT HRESULT* phrTarget
            );
Parameters
    dwFlags
        COMM_MSG_FLAGS_PERSIST
```

If this flag is specified, then the payload is immediately written to the pending directory to be sent later. This flag overrides

```
        COMM_FLAGS_PERSISTONERROR.
        COMM_MSG_FLAGS_PERSISTONERROR
```

If this flag is specified, then an attempt is made to immediately deliver the message. If an error occurs, then the payload is immediately written to the pending directory.
COMM_MSG_FLAGS_LOCALPERSISTONLY
If this flag is specified, then the below flags are removed before the message is delivered to another server:

```
        COMM_FLAGS_PERSIST
        COMM_FLAGS_PERSISTONERROR
        COMM_MSG_FLAGS_PERSISTED
```

This flag is removed before the message is delivered to another server. If this flag is specified, then the below flags are ignored:

```
        COMM_FLAGS_PERSIST
        COMM_FLAGS_PERSISTONERROR
        COMM_MSG_FLAGS_CREATEREPLYHEADER
```

This flag indicates to create a reply header from the wszHeader and to send the reply header instead of wszHeader. This flag can be used to easily reply to the original sender of a message.

```
    cwszHeader
        XML string in MessageHeader format.
    dwPayloadType
```

The payload type can be one of the following:

```
        COMM_MSG_TYPE_BINARY
            The payload type is binary data (byte)
        COMM_MSG_TYPE_XML
            The payload type is XML (WCHAR)
    dwPayloadSize
        Message payload size (bytes).
    pbPayload
        Message payload to be delivered.
    phrTarget
        Result from message handler.
```

Return Values: Will return S_OK on success else HRESULT failure code.

Regarding the MsgSend API function, every target that needs to receive a message has to register its own message handler before messages are sent to the target. The wszHeader is evaluated to determine where to deliver the message. A GUID is generated and used for each new persisted message file name. The message header and payload are persisted together in the same message file, which is stored in the Pending directory with the GUID. The Message layer maintains[s 4] a thread that manages sending persisted messages based on the target server, retry interval, and timeout given in the message header. This thread scans the Pending directory every five seconds for new message files. Each new message file found is added to a message file list that is then sorted by message file creation time. For each message file list item, the message file is opened to read a small amount of summary information that is stored at the beginning of the file. A message information queue item is then created from this information and added to the end of the appropriate server message information queue. A separate message information queue is created for each server that has one or more associated messages. In this way the original message send order, based on the message file creation time, is preserved on a per-server basis. The NextRetryTime for each message is set to MessageCreationTime+RetryInterval, and TimeoutActual is set to MessageCreationTime+Timeout. For the first queue item in each server message queue, NextRetryTime is synchronized as appropriate to be within RetryInterval CurrentTime. If NextRetryTime>TimeoutActual, then the queue item and the associated message file are deleted. If NextRetryTime<CurrentTime, then the original message file is opened to retrieve the persisted CommSendMessage parameters. Next CommSendMessage is called with the read parameters. If the call succeeds, then the message information queue item and the associated message file are deleted. Otherwise NextRetryTime is set to NextRetryTime+RetryInterval. The server message queues are traversed in this fashion until no currently scheduled messages are found in one pass of the server message queues.

MsgSendAndReceive: This function sends a message to a single target and receives a response.

```
HRESULT MsgSendAndReceive(
    IN DWORD dwFlags,
    IN LPCWSTR cwszHeader,
    IN DWORD dwPayloadType,
    IN DWORD dwPayloadSize,
    IN LPBYTE pbPayload,
    OUT HRESULT* phrTarget,
    OUT LPDWORD pdwReplyType,
    OUT LPDWORD pdwReplySize,
    OUT LPBYTE* ppbReply
    );
Parameters
    dwFlags
```

See the values and their meaning for dwFlags in the MsgSend function.

cwszheader
    NULL terminated string. An XML message header that primarily contains routing information. It has forward route information and return route information. Also the security information like, "if the message to be sent encrypted/signed/plain" and "if the reply has to come encrypted/signed/plain"

```
    dwPayloadType
        See the payload type for the MsgSend function.
    dwPayloadSize
        Message payload size (bytes).
    pbPayload
        Message payload to be delivered.
    phrTarget
        Result from message handler.
    pdwReplyType
```

The reply type can be one of the following:

```
        COMM_MSG_TYPE_BINARY
            The reply type is binary data (byte)
        COMM_MSG_TYPE_XML
            The reply type is XML (WCHAR)
    pdwReplySize
        Reply size.
    ppbReply
        Reply.
Return Values
```

Will return S_OK on success else HRESULT failure code.

MsgClientStreamingAndReceive: this function is called from the client to negotiate a streaming session with a message handler on the server.

```
HRESULT MsgClientStreamingSendAndReceive(
    IN DWORD dwFlags,
    IN LPCWSTR cwszHeader,
    IN DWORD dwPayloadType,
    IN DWORD dwPayloadSize,
    IN LPBYTE pbPayload,
    IN DWORD dwStreamingInitDataSize,
    IN LPBYTE pbStreamingInitData,
    IN MSGSTREAMINGFUNCTION pStreamingFunction,
    OUT HRESULT* phrTarget,
    OUT LPDWORD pdwReplyType,
    OUT LPDWORD pdwReplySize,
    OUT LPBYTE* ppbReply
    );
dwFlags
```

See the values and their meanings for dwflags for the MsgSend function.

wszheader
    NULL terminated string. An XML message header that primarily contains routing information. It has forward route information and return route information. Also the security information like, "if the message to be sent encrypted/signed/plain" and "if the reply has to come encrypted/signed/plain"

```
    dwPayloadType
        See the payload type for MsgSend function.
    dwPayloadSize
        The payload size (bytes).
    pbPayload
        Message payload to be delivered.
    dwStreamingInitDataSize
        Size of initialization data (bytes).
    pbStreamingInitData
```

Initialization data passed into the streaming function.

pStreamingFunction
    Streaming function that is called repeatedly as the client receives streaming data from server.

```
    phrTarget
        The value returned by the message handler.
    pdwReplyType
        See the reply type for the MsgSendAndReceive function.
    The reply type pdwReplySize
        The size of the reply (bytes).
    ppbReply
        Message reply.
Return Values
    Will return S_OK on success else HRESULT failure code.
```

MsgReceive: this function receives a message.

```
HRESULT MsgReceive(
        IN LPCWSTR cwszHeader,
        DWORD dwPayloadType,
        DWORD dwPayloadSize,
        LPBYTE pbPayload,
        HRESULT* phrTarget,
        LPDWORD pdwReplyType,
        LPDWORD pdwReplySize,
        LPBYTE* ppbReply
        );
Parameters
    cwszHeader
        Header in MessageHeader XML format.
    dwPayloadType
        See the payload type for the MsgSend function.
    dwPayloadSize
        The payload size (bytes).
    pbPayload
        The payload.
    phrTarget
        The payload.
    pdwReplyType
        See the reply type for the MsgSendAndReceive function.
    pdwReplySize
        The reply size (bytes).
    ppbReply
        The reply.
```

The communication (Comm) APIs are described below. These APIs implement extended communication services, including routing and security. These APIs rely on the transport layer APIs and communication security APIs to provide basic services.

CommCreate: this function returns a communications handle to use with the Comm APIs. The communications handle maintains the state of a connection between calls to the different Comm APIs.

```
HRESULT CommCreate(
        IN HCOMM* phComm
        );
Parameters
    phComm
        Pointer to the communications handle.
Return Values
    Will return S_OK on success else HRESULT failure code.
```

CommOpen: this function opens a connection using the connection an security information provided in the given message header.

```
HRESULT CommOpen(
        IN HCOMM hComm,
        IN LPCWSTR cwszHeader,
        IN DWORD dwTimeout
        );
Parameters
    hComm
        communications handle.
    cwszHeader
        XML string in CommHeader format.
    dwTimeout
        Maximum time to wait to open connection to all targets.
Return Values
    Will return S_OK on success else HRESULT failure code.
```

Remarks
The connection will fail if the protocol and security (optional) DLLs can not be found or loaded successfully.

CommSend: this function sends the given data via the given communication handle.

```
HRESULT CommSend(
        IN HCOMM hComm,
        IN LPCWSTR cwszHeader,
        IN DWORD dwDataSize,
        IN LPBYTE pbData,
        IN DWORD dwTimeout
        );
Parameters
    hComm
        The communications handle.
    cwszHeader
        XML string in CommHeader format.
    dwDataSize
        Size of data to be sent (bytes).
    pbData
        Data to be sent.
    dwTimeout
```

Maximum time to wait for all data to be sent.

CommReceive: this function receives the data via the given communication handle. A communication handle is an object that is created while a communication starts (by the CommOpen( ) function) and is used throughout the communication session.

```
HRESULT CommReceive(
        IN HCOMM hComm,
        IN LPDWORD pdwDataSize,
        IN LPBYTE* ppbData,
        IN DWORD dwTimeout
        );
Parameters
    hComm
        The communications handle.
    pdwDataSize
        Pointer to size of data received (bytes).
    ppbData
        Data received.
    dwTimeout
```

Maximum time to wait for data to be received.

CommClose: this function closes the given communications handle.

```
HRESULT CommClose(
        IN HCOMM hComm
        );
Parameters
    hComm
```

The communications handle.

CommStartReceive: this function creates a thread to accept new connections based on the connection and security information provided in the given message header.

```
HRESULT CommStartReceive(
        IN HCOMM hComm,
        IN LPCWSTR cwszHeader,
        IN COMMCONNECTIONHANDLER pfHandler,
        IN LPVOID pvParameter
        );
Parameters
    hComm
        The communication handle.
    cwszHeader
        XML string in CommHeader format.
    pfHandler
```

Function to call after accepting a new connection. This function will be passed the new connection handle and pvParameter.

pvParameter
 Handler context parameter.

CommEndReceive: this function ends the connection server thread previously created.

```
HRESULT CommEndReceive(
        IN HCOMM hComm,
        IN DWORD dwTimeout
        );
Parameters
    hComm
        The communication handle.
    dwTimeout
```

Maximum time to wait for the connection server thread to end.

CommDelete: this function deletes the communications handle.

```
HRESULT CommDelete(
        IN HCOMM hComm
        );
Parameters
    hComm
```

Communication handle.

The communication security (CommSec) APIs implement communication services, including authentication, signing, and encryption.

CommSecCreate: this function tries to create a communication security handle returned from the security DLL (the cwszDLL) to be used to obtain security services as specified by the application layer.

```
HRESULT CommSecCreate(
IN LPCWSTR cwszDLL,
IN HCOMMSECURITY* phCommSecurity
);
Parameters
    cwszDLL
        Protocol DLL.
    phCommSecurity
```

Pointer to the communications security handle.

CommSecClientInit: this method attempts to initialize client security for the given connection.

```
HRESULT CommSecClientInit(
        IN HCOMMSECURITY hCommSecurity,
        IN HCOMMPROTOCOL hCommProtocol,
        IN LPCWSTR cwszHeader
        );
Parameters
    hCommSecurity
        The communications security handle.
    hCommProtocol
        The communications protocol handle.
    cwszHeader
        XML header in CommSecurity format.
```

CommSecServerInit: this method attempts to initialize server security for the given connection.

```
HRESULT CommSecServerInit(
        IN HCOMMSECURITY hCommSecurity,
        IN HCOMMPROTOCOL hCommProtocol,
        IN LPCWSTR cwszHeader
        );
Parameters
    hCommSecurity
        The communications security handle.
    hCommProtocol
        The communications protocol handle.
    cwszHeader
        XML header in CommSecurity format.
```

CommSecSend: this method attempts to send data with the given security services before the given timeout.

```
HRESULT CommSecSend(
        IN HCOMMSECURITY hCommSecurity,
        IN DWORD dwFlags,
        IN DWORD dwDataSize,
        IN LPBYTE pbData,
        IN DWORD dwTimeout
        );
Parameters
    hCommSecurity
        The communications security handle.
    dwFlags
        Security service flags (COMMSECURITY_FLAGS_*).
    dwDataSize
        Data size.
    pbData
        Data.
    dwTimeout
        Timeout.
```

CommSecReceive: this method attempts to receive data before the given timeout.

```
HRESULT CommSecReceive(
        IN HCOMMSECURITY hCommSecurity,
        IN DWORD dwDataSize,
        IN LPBYTE pbData,
        IN DWORD dwTimeout
        );
Parameters
    hCommSecurity
        communications security handle.
    dwDataSize
        Data size.
    pbData
        Data.
    dwTimeout
        Timeout.
```

CommSecDelete: this method deletes the given communications handle.

```
HRESULT CommSecDelete(
        IN HCOMMSECURITY hCommSecurity
        );
Parameters
    hCommSecurity
        communications security handle.
```

The communication protocol (CommProtocol) APIs are the lowest level communication APIs. Each communications protocol supported will have its own DLL with an implementation of the APIs specific t that protocol.

CommProtocolCreate: This method attempts to create a protocol handle returned from the given DLL.

```
HRESULT CCommProtocolCreate(
        IN LPCWSTR cwszDLL,
        IN HCOMMPROTOCOL* phCommProtocol
        );
Parameters
    cwszDLL
        Protocol DLL.
    phCommProtocol
        Pointer to communications protocol handle.
```

CommProtocolClientOpen: this method attempts to open a connection to a server using the connection information in the given header before the given timeout occurs.

```
HRESULT CommProtocolClientOpen(
        IN HCOMMPROTOCOL hCommProtocol,
        IN LPCWSTR cwszHeader,
        IN DWORD dwTimeout
        );
Parameters
    hCommProtocol
        communications protocol handle.
    cwszHeader
        XML header in CommProtocol format.
    dwTimeout
        Timeout.
```

CommProtocolSend: this method attempts to send the given data before the given timeout occurs.

```
HRESULT CommProtocolSend(
        IN HCOMMPROTOCOL hCommProtocol,
        IN DWORD dwDataSize,
        IN LPBYTE pbData,
        IN DWORD dwTimeout
        );
Parameters
    hCommProtocol
        communications protocol handle.
    dwDataSize
        Data size.
    pbData
        Data.
    dwTimeout
        Maximum time to wait to send all data.
```

CommProtocolReceive: this method attempts to receive the given data before the timeout occurs.

```
HRESULT CommProtocolReceive(
        IN HCOMMPROTOCOL hCommProtocol,
        IN DWORD dwDataSize,
        IN LPBYTE pbData,
        IN DWORD dwTimeout
        );
Parameters
    hCommProtocol
        communications protocol handle.
    dwBufferSize
        Data size.
    pbBuffer
        Data.
    dwTimeout
        Maximum time to wait to receive all data.
```

CommProtocolServerInit: This method attempts to initialize a server connection for accepting client connections with the connection information in the given header.

```
HRESULT CommProtocolServerInit(
        IN HCOMMPROTOCOL hCommProtocol,
        IN LPCWSTR cwszHeader
        );
Parameters
    hCommProtocol
        communications protocol handle.
    cwszHeader
        XML header in CommProtocol format.
```

CommProtocolServerOpen: this method attempts to open a client connection before the given timeout occurs.

```
HRESULT CommProtocolServerOpen(
        IN HCOMMPROTOCOL hCommProtocol,
        IN DWORD dwTimeout,
        OUT HCOMMPROTOCOL* phCommProtocol
        );
Parameters
    hCommProtocol
        Server communications protocol handle.
    dwTimeout
        Timeout.
    phCommProtocol
        Pointer to client communications protocol handle.
```

CommProtocolClose: this method attempts to close the connection associated with the given protocol handle.

```
HRESULT CommProtocolClose(
        IN HCOMMPROTOCOL hCommProtocol
        );
Parameters
    hCommProtocol
        communications protocol handle.
```

CommProtocolDelete: this method deletes the given protocol handle.

```
HRESULT CommProtocolDelete(
        IN HCOMMPROTOCOL hCommProtocol
        );
Parameters
    hCommProtocol
        communications protocol handle.
```

In view of the many possible embodiments to which the principles of this invention may be applied, it should be recognized that the embodiments described herein with respect to the drawing figures are meant to be illustrative only and should not be taken as limiting the scope of the invention. Therefore, the invention as described herein contemplates all such embodiments as may come within the scope of the following claims and equivalents thereof.

What is claimed is:

1. A computer-readable medium having computer-executable components of a communication stack on an origin computer for delivering a message from an application on the origin computer to an application on a target computer, the communication stack comprising:

a message layer interfacing with the application to obtain from the application on the origin computer a message to be delivered to the application on the target computer and routing information identifying the target computer and routing computers in a selected route to the target computer, the routing information including data identifying a transport protocol to be used with each routing computer in the selected route to the target computer;

a communication layer callable by the message layer to open a secured connection to the target computer through the selected route provided by the application on the origin computer and sending a message payload to the target computer through the connection;

a security layer callable by the communication layer for performing security operations on outgoing and incoming network communications;

a transport protocol layer callable by the communication layer for sending messages via a selected transport protocol, the transparent protocol layer having a plurality of plug-in transport protocol modules implementing different transport protocols;

the communication layer being programmed to use the transport protocol layer to send a connection message via the selected route to the target computer to establish the secured connection, and call the security layer after the secured connection is established to negotiate security parameters with the target computer and perform security operations on subsequent communications with the target computer.

2. A computer-readable medium as in claim 1, wherein the plug-in transport protocol modules implement TCP and UDP.

3. A computer-readable medium as in claim 1, wherein the security layer has a plurality of plug-in security protocol modules selectable for applying different security mechanisms.

4. A computer-readable medium as in claim 1, wherein the message layer on the origin computer receives the message to be delivered and routing information from the application on the origin computer in an XML document.

5. A computer-readable medium as in claim 1, wherein the message layer on the origin computer is programmed to store the message to be delivered in a persistent storage if said message cannot be delivered at a present time.

6. A computer-readable medium as in claim 1, wherein the communication stack further includes a plurality of cryptographic application programming interface (API) functions callable for providing cryptographic services.

7. A computer-readable medium as in claim 1, wherein the security layer on the origin computer is programmed to negotiate security parameters with a corresponding security layer of a corresponding communication stack on the target computer after the secured connection is established between the origin computer and the target computer.

8. A computer-readable medium as in claim 1, wherein the security layer is programmed to negotiate with the corresponding security layer of the target computer to obtain a symmetric security key for encrypting and signing subsequent communications with the target computer after the secured connection is established between the origin computer and the target computer.

9. A computer-readable medium as in claim 1, wherein the message payload has a message header containing data identifying computers in the route to the target computer.

10. A computer-readable medium as in claim 1, wherein the message layer exposes a first group of application programming interface (API) functions callable by the application on the origin computer to use functionality of the message layer for message delivery.

11. A computer-readable medium as in claim 10, wherein the communication layer exposes a second group of application programming interface (API) functions callable by the message layer to use functionality of the communication layer.

12. A computer-readable medium as in claim 11, wherein the security layer exposes a third group of application programming interface (API) functions callable by the communication layer for performing security operations.

13. A computer-readable medium as in claim 12, wherein the transport protocol layer exposes a fourth group of application programming interface (API) functions callable by the communication layer and the security layer for sending messages using a selected pluggable transport protocol module.

14. A method for delivering a message to a target computer, comprising:

providing a communication stack on an origin computer having a message layer, a communication layer, a security layer, and a transport protocol layer, the transport layer having a plurality of plug-in transport protocol modules implementing different transport protocols; and invoking the message layer to deliver the message, including passing to the message layer the message to be delivered to the target computer and routing information identifying the target computer and routing computers in a selected route to the target computer, the routing information including data identifying a transport protocol to be used with each routing computer in the selected route to the target computer, the communication layer being callable by the message layer to open a secured connection to the target computer through the selected route provided by an application on the origin computer and send messages to the target computer through the connection, the security layer being callable by the communication layer for performing security operations on outgoing and incoming network communications, and the transport protocol layer being callable by the communication layer for sending messages via a selected transport protocol module, the communication layer being programmed to use the transport protocol layer to send a connection message via the selected route to the target computer to establish the secured connection, and to call the security layer to negotiate security parameters with the target computer and perform security operations on subsequent communications with the target computer after establishing the secured connection.

15. A method as in claim 14, wherein the step of invoking the message layer calls an application programming interface (API) function exposed by the message layer.

16. A method as in claim 14, wherein transport protocol module is used with each routing computer.

17. A method as in claim 14, wherein the step of invoking the message layer includes passing information to the message layer identifying a plurality of security mechanisms to be tried by the security layer with the target computer for establishing security parameters after the secured connection is established between the origin computer and the target computer.

18. A method as in claim 14, wherein the step of invoking the message layer includes passing the message to be sent to the target computer and routing information in an XML document.

19. A method as in claim 14, wherein the message layer is programmed to store a message to be delivered to the target computer in a persistent storage if said message cannot be delivered at a present time.

20. A computer networking system for network communications, comprising:

an origin computer, a target computer, and at least one routing computer disposed between the origin computer and target computer for routing network communications between the origin and target computers, each of the origin, target, and routing computers implementing a communication stack including a message layer, a communication layer, a security layer, and a transport protocol layer, the transport protocol layer of the origin computer having a plurality of plug-in transport protocol modules implementing different transport protocols; and an application on the origin computer using the communication stack on the origin computer to delivery a message to a target application on the target computer by invoking the message layer of the origin computer and passing the message to be delivered and routing information identifying a selected route from the origin computer to the target computer, said selected route including said at least one routing computer, said routing information including data identifying a transport protocol to be used with each routing computer in the selected route to the target computer;

wherein the message layer of the origin computer calls the communication layer of the origin computer to connect to the target computer, the communication layer of the origin computer calls the transport protocol layer of the origin computer to send a connection message through the selected route to the target computer to establish a secured connection, and calls the security layer of the origin computer to negotiate security parameters with the security layer of the target computer and to perform security operations on subsequent messages sent to and received from the target computer after the secured connection is established, and wherein the communication stack of the routing computer receives the connection message, recognizes that the routing computer is not a destination of the connection message, forwards the connection message to a next stop in the selected route toward the target computer, and routes subsequent communications between the origin computer and the target computer.

21. A computer networking system as in claim 20, wherein the communication stack of the target computer recognizes that the target computer is the destination of the connection message and calls the security layer of the communication stack of the target computer to negotiate with the security layer of the communication stack of the origin computer.

22. A computer networking system as in claim 21, wherein the communication stack of the target computer registers a message handler for the target application to receive communications from the origin computer.

23. A computer networking system as in claim 20, wherein the application on the origin computer passes the message to be delivered and the routing information to the message layer in an XML document.

24. A computer networking system as in claim 20, wherein the plug-in transport protocol modules implement TCP and UDP.

25. A computer networking system as in claim 20, wherein the security layer of the origin computer has a plurality of plug-in security protocol modules selectable for applying different security mechanisms.

26. A computer networking system as in claim 20, wherein the message layers of the origin and routing computers are programmed to store a message to be delivered to the target computer in a persistent storage if said message cannot be delivered at a present time.

27. A computer networking system as in claim 20, wherein the communication stack of the origin computer further includes a plurality of cryptographic application programming interface (API) functions callable for providing cryptographic services.

28. A computer networking system as in claim 20, wherein each message to be delivered by the origin computer to the target computer has a message header containing data identifying routing computers in the selected route to the target computer.

* * * * *